(12) United States Patent  
Burgess

(10) Patent No.: US 6,741,790 B1
(45) Date of Patent: May 25, 2004

(54) GPS VIDEO MAPPING SYSTEM

(75) Inventor: Ken L. Burgess, Fort Collins, CO (US)

(73) Assignee: Red Hen Systems, Inc., Fort Collins, CO (US)

( * ) Notice: Subject to any disclaimer, the term of this patent is extended or adjusted under 35 U.S.C. 154(b) by 0 days.

(21) Appl. No.: 09/424,698

(22) PCT Filed: May 29, 1998

(86) PCT No.: PCT/US98/10984

§ 371 (c)(1),
(2), (4) Date: Dec. 23, 1999

(87) PCT Pub. No.: WO98/54896

PCT Pub. Date: Dec. 3, 1998

Related U.S. Application Data

(60) Provisional application No. 60/047,901, filed on May 29, 1997.

(51) Int. Cl.[7] .............................. H04N 5/91; H04N 7/04
(52) U.S. Cl. ........................................... 386/46; 386/96
(58) Field of Search .............................. 386/46, 83, 96, 386/104, 105, 106, 107, 117–124, 40; 348/116, 119, 144, 222.1

(56) References Cited

U.S. PATENT DOCUMENTS 5,633,946 A * 5/1997 Lachinski et al.
6,023,241 A    2/2000 Clapper .................. 342/357.13

FOREIGN PATENT DOCUMENTS

AU           B-68662/94    * 2/1996
JP           406006750 A   * 1/1994

* cited by examiner

*Primary Examiner*—Robert Chevalier
(74) *Attorney, Agent, or Firm*—Greenberg Traurig, LLP; John R. Posthumus, Esq.

(57) ABSTRACT

The system of the present invention includes a hardware device (40) and software, which are configurable and operable in three modes: recording mode, indexing mode, and playback mode. In the recording mode, the hardware device (40) is connected to a GPS receiver (44) and video recording device (42), and permits GPS data to be recorded on the same recording medium that images are recorded on using the video recording device (42). As a result, a particular geographic location associated with particular images can be directly referenced by GPS data. After recording the images, the hardware device (40) is connected to a computer (46) having the software of the present invention installed, and the system causes GPS data to be transferred from the recording medium to the computer (46) as the recorded images are replayed. During this step, called the indexing mode, the computer (46) draws a map showing all of the GPS referenced locations recorded on the recording medium. Each map location represents a location where images were recorded with GPS data. Once the indexing mode is completed, the system can be used to play back the images recorded, in accordance with the selection of a location on a map. During this step, called the playback mode, a marker may be selected on the computer (46) generated indexed map, and the system will cause the video recording device (42) to play back the images that were recorded at that selected location. Alternatively, if the recorded images have been transferred to some other media, for example CD ROM or hard disk, the system will cause the computer (46) to play back the images that were recorded at that selected location.

19 Claims, 12 Drawing Sheets

GPS VIDEO MAPPING SYSTEM

This application is a 371 of PCT/U.S.98/10984 filed May 29, 1998, which claims benefit of Provisional Application Ser. No. 60/047901 filed May 29, 1997.

FIELD OF THE INVENTION

The present invention relates generally to the field of geographical information systems. The present invention relates particularly to correlating geographical information from a global positioning system with images that are recorded by a portable video recording device.

BACKGROUND OF THE INVENTION

Video recording devices record images and associated audio on a recording medium, such as for example a tape, for later play back. Some video recording devices, such as for example a VCR, include a video input port and an audio input port, which are connected directly to a video source and/or an audio source, such as for example a television or cable box, and a power source, such as for example a 110-volt outlet. Other video recording devices are portable, such as for example a camcorder. Portable video recording devices are usually hand held, battery operated devices, and include a lens, which allows a user of the portable video recording device to record images, and one or more microphones, which allows a user to record audio associated with the images recorded. Typically, portable video recording devices are capable of recording sound stereophonically and thus, will have two audio channels. Some portable video recording devices also include an audio input port to which an audio source can be directly connected. A portable video recording device allows a user to record events as they occur at locations remote from a power source.

Video recording devices also reproduce, i.e., playback, images and audio that have been previously recorded. In this regard, a video recording device may be connected directly to a video display device, such as for example a television, such that previously recorded images may be reproduced on the display device. Portable video recording devices sometimes have a small display screen which allows a user of the video recording device to view the images being recorded by the portable video recording device, as well as view images that were previously recorded.

Video recording devices typically record images and associated audio from a video and audio source in sequential sequence on tape. For example, a family on a cross country road trip may stop at various sites of interest and record images and audio at those sites for later viewing. When the tape is later viewed, the recorded images and associated audio are viewable in the sequence in which the images and associated audio were recorded. In order to track the relative location of recorded images and associated audio, video recording devices usually include a counter which provides a numerical value which corresponds to the position of the tape. For example, the counter may be a relative numerical value or a temporal based numerical value. Thus, a user of a portable video recording device is able to track the location on the tape of a particular set of recorded images and associated audio by manually noting the value of the counter when the images are recorded. For example, when a family stops at Niagara Falls and record images and audio at that site, the value of the counter can be manually noted at the time of recording and correlated to the geographic location of the images and associated audio. When the tape is later viewed, a user can use the manual recordation of the counter to cue the tape to the images desired to be viewed. Alternatively, a user can locate a particular set of recorded images by playing the tape, either in a forward or backward direction, until the desired set of recorded images and associated audio is viewed.

A global positioning system is a commonly used source of geographic position data. In this regard, a global positioning system compatible receiver can be used to identify the geographic position of the receiver. The global positioning system compatible receiver generally ascertains its geographic position by detecting radio signals transmitted by satellites in an earth orbit. Reception of the signals allows the global positioning system compatible receiver to pinpoint the receiver's location in terms of longitude and latitude coordinates. Commercially available global positioning system compatible receivers typically include a display screen to display the geographic information to the user of the receiver. Commercially available global positioning system compatible receivers also typically include an output port which communicates the geographic information using a digital message (RS-232) protocol.

Commercially available mapping software, such as for example software known under the names MAPINFO and ARCVIEW, can be used to display a map of a geographic area. Commercially available mapping software can also accept as input geographic information from a global positioning system-compatible receiver and indicate the location corresponding to the geographic information on a displayed map.

SUMMARY OF THE INVENTION

There are a number of applications for which it is desirable to correlate images recorded with a portable video recording device with geographic information from a global positioning system, where the geographic information corresponds to the geographic location where the images were recorded. Among these applications are situations where images are recorded at remote locations for subsequent viewing, based in part, on the geographic location where the images were recorded. For example, governmental agencies and farmers use portable video recording devices to monitor the plant growth at remote locations for agricultural purposes, such as determining the effectiveness of weed control programs or the growth rate of crops. By way of further example, travelers use portable video recording devices to record particular points of interest, such as for example Niagara Falls, Mt. Rushmore or the Grand Canyon, to provide themselves with visual memories of their travels. In these and other situations, it is desirable to provide a way which facilitates the viewing of recorded images based on the selection of the geographic location whereat the images were recorded.

It is an object of the present invention to provide a method and apparatus for simultaneously recording images and geographic information provided by a global positioning system on a single recording medium.

It is a further object of the present invention to provide a method and apparatus for relating geographic information provided by a global positioning system with the position of recorded images on a recording medium.

It is a further object of the present invention to provide a method and apparatus for viewing recorded images based on the selection of geographic information.

The present invention relates to an apparatus and method for correlating video recordings by geography. The applications of the present invention are many. For example, in agriculture the present invention can be used in insect and weed control, plant health analysis, water management, and similar tasks. In real estate, the present invention can be used for "virtual" property tours, neighborhood evaluation, and mapping property location. For utility companies, the present invention can be used to help maintain distribution systems such as poles, transformers, hydrants etc. For street maintenance, the present invention can be used to evaluate the condition and map repairs of roads and bridges, culverts, potholes, signage, painted traffic lines, etc. The present invention can also be used in police and emergency services, natural resource management, environmental monitoring and general graphical information system map-making. The present invention can be used in "vacation" mapping, hunting, fishing, bicycling, or hiking excursions where geographic indexing makes access to video records simple and fun.

One aspect of the present invention includes simultaneously recording images and information corresponding to the geographic location of the images being recorded, on a single recording medium. In this regard, a portable video recording device can be used to record video images on a recording medium, such as video tape, and geographic information relevant to the recorded video images, such as on an audio channel of the recording medium. The geographic information can include data provided by a global positioning system. If the portable video recording device is capable of recording audio stereophonically, only one of the audio channels need be used to record geographic information. The other audio channel can be used to record other information, such as for example verbal attribute information relevant to the image recorded.

In one embodiment of the present invention, a method is provided for use with a portable video recording device for simultaneously recording images and audible geographic information. The method includes receiving geographic-related position signals from at least one satellite source in an earth orbit, and converting the geographic related position signals into a format which is capable of being audibly recorded by the portable video recording device. The method further includes using a portable video recording device to simultaneously record images and audible geographic information, corresponding to the geographic location of the portable video recording device, on a single recording medium. The method includes formatting the geographic-related position signals into analog format. Alternatively, the method includes formatting the geographic-related position signals into digital format.

In another embodiment of the present invention, the method includes audibly recording information pertaining to the direction the portable video recording device is recording images. In this regard, a portable video recording device includes a lens which allows the portable video recording device to record images. The method includes using a compass to provide directional-related data regarding the direction the portable video recording device is recording images and converting the directional-related data into directional information capable of being audibly recorded by the portable video recording device.

In another embodiment of the present invention, an apparatus is provided for use with a portable video recording device to permit the portable video recording device to simultaneously record images and audible geographic information on a single recording medium. The apparatus includes a receiver for receiving geographic-related position signals from at least one satellite in an earth orbit, and a converter for converting the geographic-related position signals into geographic information which is capable of being audibly recorded by the portable video recording device. The apparatus can be used to provide audibly formatted geographic information to the portable video recording device while the device is being used to record images. The apparatus can be used to continuously provided formatted geographic information to the portable video recording device. Alternatively, the apparatus can be used to selectively provide formatted geographic information for a portion of the time the portable video recording device is used to record images. The apparatus formats the geographic-related position signals into analog format. Alternatively, the apparatus formats the geographic-related position signals into digital format.

In another embodiment of the present invention, the apparatus includes an audio output port which can be electrically connected to the audio input port of a portable video recording device. In this regard, the apparatus can be used to provide formatted geographic information directly to the portable video recording device. Alternatively, the apparatus includes a speaker for producing an audible sound. In this regard, the apparatus can be used to produce an audible sound which is capable of being detected by a microphone located on the portable video recording device. With either embodiment, the apparatus can be used to allow the portable video recording device to simultaneously record images and geographic information on a single recording medium.

In another embodiment of the present invention, a hardware component is provided which can be electrically connected to a global positioning system-compatible receiver and logs messages from the receiver by converting the information produced by the receiver from a digital message protocol to audio signals. The hardware component is further capable of being electrically connected to the audio input port of a video recording device so that the audio signals can be recorded onto an audio channel when the video recording device is used to make a video recording. If the video recording device supports stereo, only one audio channel is used for recording audio signals related to the digital message protocol, leaving the other audio channel free for other uses, such as for example recording attribute information. It is important to note that a computer is not required for the recording operation. This is an advantage of the present invention because the recording video operation often occurs in the field where it is inconvenient and often difficult to carry and operate a computer.

In another embodiment of the present invention, an apparatus is provided for simultaneously recording images and related geographic information. In this regard, the apparatus integrates into a portable video recording device the means to selectively record geographic information when the portable video recording device is used to record images. The apparatus includes the video/audio recording means, which are typically found in a portable video recording device, for simultaneously recording images and audible sound on a single recording medium. The apparatus further includes geographic position receiver means for receiving geographic-related position signals from at least one satellite source in an earth orbit, and conversion means for converting the geographic-related position signals received by said geographic position receiver means into geographic information capable of being audibly recorded by the video/audio recording means.

In another aspect of the present invention, audibly recorded geographic information provided by a global positioning system is related with the position of recorded images on the recording medium. In one embodiment of the present invention, an apparatus is provided which can be electrically connected to the audio output port of a video recording device and converts the audio encoding of geographic information into a format which is compatible with commercially available mapping software. The apparatus further includes interface means for receiving from the video recording device information corresponding to the relative position of the recording medium being played by the video recording device. The apparatus further includes means for being electrically connected to a geographic information system computer (i.e., a computer that is capable of understanding geography and geographic data) via a digital protocol (RS-232) interface.

In another embodiment of the present invention, a hardware component is provided which can be electrically connected to the audio output port of a video recording device and converts the audio encoding of data provided by the global positioning system-compatible receiver back into the original digital message protocol. The hardware component includes a Control-L (or LanC) interface to the video recording device so that video time-code information can also be extracted from the video stream. The hardware component is further capable of being electrically connected to a geographic information system computer (i.e., a computer that is capable of understanding geography and geographic data) via a digital protocol (RS-232) interface.

In one embodiment of the present invention, a method is provided for relating geographic information recorded on the recording medium to the position of the recording medium whereat images, corresponding to geographic information, are recorded. The method is for use with a recording medium containing recorded images and recorded audible sounds related to geographic information and a video recording device that is capable of reproducing images and audible sound recorded on a recording medium and further capable of tracking the relative position of the recording medium. The method includes reproducing the audible sound recorded on at least a portion of the recording medium containing recorded images and audible geographic information, and converting at least a portion of the audible sound relating to the geographic information into digitally formatted geographic information. The method further includes relating the digitally formatted geographic information to the relative position of recording medium whereat the audible sound relating to the geographic information is located. As a consequence, the geographic information becomes associated with the relative position of the recording medium whereat images, recorded at the geographic location corresponding to the geographic information, are located.

In another embodiment of the present invention, the step of relating the digitally formatted geographic information to the relative position of recording medium whereat the audible sound relating to the geographic information is located includes processing the geographic information and the relative position of the recording medium into a database that associates geographic information with a relative position of the recording medium whereat images, recorded at the geographic location corresponding to the geographic information, are located. In another embodiment of the present invention, the step of relating the digitally formatted geographic information to the relative position of recording medium whereat the audible sound relating to the geographic information is located includes processing the geographic information and corresponding video time codes into a database that associates geographic information with the corresponding video time codes.

In another aspect of the present invention, images recorded on a recording medium are viewable based on the selection of geographic information corresponding to the location whereat the images were recorded. In this regard, the geographic information recorded is processed with mapping software, such as MAPINFO or ARCVIEW, to display a map and to indicate on the displayed map where images have been recorded, such as displaying visual icons on the displayed map. For example, if certain weeds are recorded at a specific geographic location, an icon is displayed on the map to indicate that video was recorded of the location the icon is positioned. Additionally, attribute information associated with the video images recorded can also be displayed. For example, the words HOVER DAM are displayed next to an icon indicating that video images of Hover Dam are available for viewing. By way of further example, if images were continuously recorded while driving along a road, a line segment is displayed on the displayed map to indicate that video was recorded at the geographic locations whereat the line is positioned. Additionally, attribute information associated with points along the displayed line can also be displayed. Moreover, the recorded images are capable of being played back in accordance with geographic location and user input. For example, an icon displayed on a map indicating that video of certain weeds at the specified geographic location can be selected (e.g., by the use of a mouse device or touch-screen device) to display the video recorded. By way of further example, any point along a line segment displayed can be selected to display the images recorded at that particular point or to start displaying images recorded at that point and to continue displaying the recorded images, forwards or backwards. In this regard, the recorded images associated with a geographic location can be cued according to the relative position, such as time codes, associated with a selected geographic location.

In one embodiment of the present invention, an apparatus is provided which is capable of being electrically connected to a geographic information system computer and which is also capable of being electrically connected to a video recording device. The apparatus includes an interface to control the video recording device, such as for example positioning the recording medium held by the video recording device, and causing the video recording device to display images recorded on the recording medium. The apparatus further includes a second interface to receive information regarding controlling the video recording device, such as for example the position whereat the recording medium is to located, and control information indicating, for example, whether images are to be displayed at normal speed, in fast forward or in reverse.

In another embodiment of the present invention, a hardware component is provided which is capable of being electrically connected to a geographic information system computer and which is also capable of being electrically connected to a video recording device through a Control-L interface. The geographical information system computer controls video play back through the video recording device through the Control-L interface. Thus, for example, when a user selects an icon associated with a geographic location for which recorded images exists, the relative position, such as the time code for that location, is communicated to the hardware component, which in turn causes the video recording device to position the recording medium to the relative position, and play back the images recorded at hat position.

In another aspect of the present invention, recorded images can be played back based on the actual real time position provided by a global positioning system compatible receiver. In this regard, the present invention is capable of providing a "tour bus" mode wherein the real time geographic position is used to start play back of previously recorded images corresponding to the real time geographic position. In this way, the delivery of tour information can be automatically synchronized with the arrival to a geographic location independent of the speed of motor vehicle travel or the route the motor vehicle takes to the points of interest.

DETAILED DESCRIPTION

The system of the present invention includes a hardware device and software, which are configurable and operable in three modes: recording mode, indexing mode, and playback mode. In the recording mode, the hardware device is connected to a GPS receiver and video recording device, and permits GPS data to be recorded on the same recording medium that images are recorded on using the video recording device. As a result, a particular geographic location associated with a particular images can be directly referenced by GPS data. This is important because the GPS data will automatically be transferred as part of the normal editing of the recording medium to edit out and/or combine video images. After recording the images, the hardware device is connected to a computer having the software of the present invention installed, and the system causes GPS data to be transferred from the recording medium to the computer as the recorded images are replayed. During this step, called the indexing mode, the computer draws a map showing all of the GPS referenced locations recorded on the recording medium. Each map location represents a location where images were recorded with GPS data. Once the indexing mode is completed, the system can be used to play back the images recorded, in accordance with the selection of a location on a map. During this step, called the playback mode, a marker may be selected on the computer generated indexed map, and the system will cause the video recording device to play back the images that were recorded at that selected location. Alternatively, if the recorded images have been transferred to some other media, for example CD ROM or hard disk, the system will cause the computer to play back the images that were recorded at that selected location.

Figure 1:
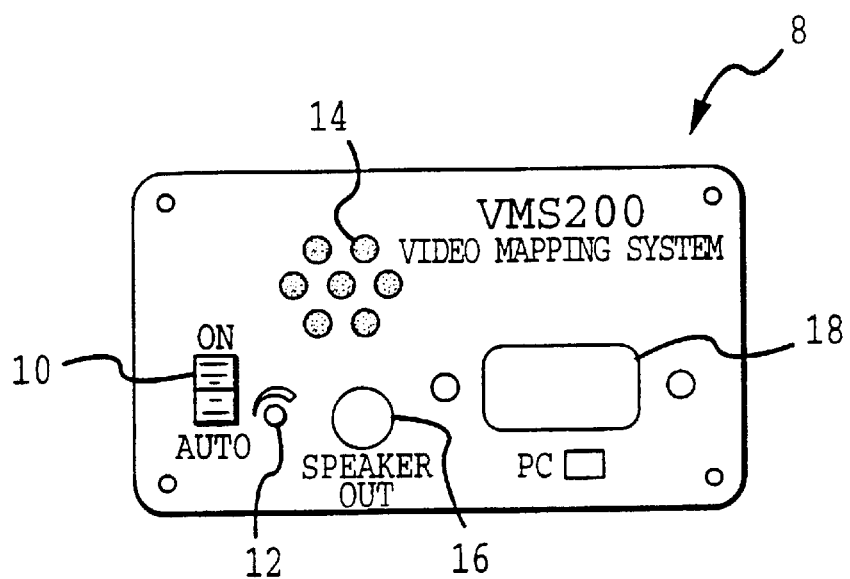
FIG. 1 shows the front panel of the hardware device in accordance with one embodiment of the present invention.
Figure 2:
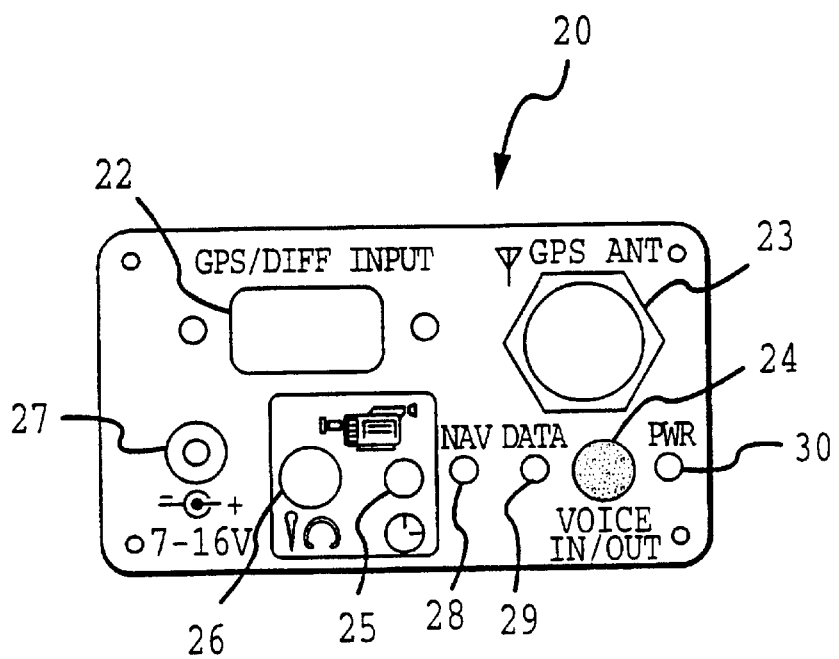
FIG. 2 shows the rear panel of the hardware device in accordance with one embodiment of the present invention.

The front and rear panels of the hardware device are shown in FIGS. 1 and 2 respectively. The front panel 8 includes a power off/on switch 10, volume control 12, speaker 14, speaker output connector 16, and a computer compatible-serial port 18. The rear panel 20 includes a GPS differential input connector 22, a GPS antenna connector 23, a voice in/out connector 24, a LanC connector 25, a microphone in/out connector 26, an external power connector 27, navigation light 28, data light 29 and power light 30. The power on/off switch 10 includes "on" and "auto" modes. When the switch 10 is in the "on" position, the hardware device is powered continuously. When the switch 10 is in the "auto" position, power to the hardware device automatically turns on when the video recording device is turned on. In this regard, the hardware device detects whether the microphone connector 26 has voltage as a result of being connected to an input microphone connector of a video recording device which is on. The "auto" position is advantageous for use of the hardware device in the recording mode because recording often will occur in the field, where the hardware device is commonly positioned on a The volume/control switch 12 adjusts the speaker's 14 volume. The speaker user's belt or in a user's backpack and the power switch is not readily accessible, output connector 16 allows for headphones to be connected and worn by a user to hear sounds that are normally outputted through the speaker 14. When the speaker output connector 16 is used, the speaker 14 is muted. The hardware device is capable of outputting status tones and clicks using either the speaker output connector 16 or the speaker 14. The computer compatible-serial port 18 permits the hardware device to be connected to a computer using, for example a 9-pin RS-232 cable. The GPS data recorded on the recording medium during the recording mode is sent to the computer through this connection during the indexing mode. Preferably, the data output of the computer compatible-serial port 18 has at least a baud rate of at least 9600, is of 8 bits, has no parity, and has one stop bit. The external power connector 27 accepts an adapter jack and is capable of using an AC power adapter or cigarette lighter adapter. The voice in/out connector 24, in the recording mode, accepts input from a mono microphone for recording voice information on the recording medium, if the video recording device is capable of stereo recording. The voice in/out connector 24, in the playback mode, is used to output any voice notations through headphones or a separate speaker. In the recording mode, the microphone in/out connector 26 is connected to the video recording device's microphone input connector. In the playback mode, the microphone in/out connector 26 is connected to the video recording device's headphone output. In the playback mode, the LanC connector 25 is connected to the LanC connector of the video recording device. This connection allows the system of the present invention to control the video recording device's playback functions.

The navigation light 28, data light 29 and power light 30 are used to indicate various statuses of the hardware device. When powering up, the navigation light 28, data light 29 and power light 30 all flash initially, the data light 30 stays on during initialization, and the navigation light 28 comes on after initialization. During operation, the navigation light 28 will flash rapidly to indicate that no GPS fix has been obtained by the GPS source. A "solid" or "on" navigation light 28 indicates that a GPS fix has been obtained. When the navigation light 28 stays on for two seconds, and off for half a second, this indicates the differential fix has been obtained. When the data light 29 blinks, this indicates that GPS data is being sent to the video recording device, during the recording mode, or the computer, during the index mode. When the data light 29 or navigation light 28 are on, but the power light is off, a self-test failure has occurred. The power light 30 indicates that the hardware device has power.

Figure 3:
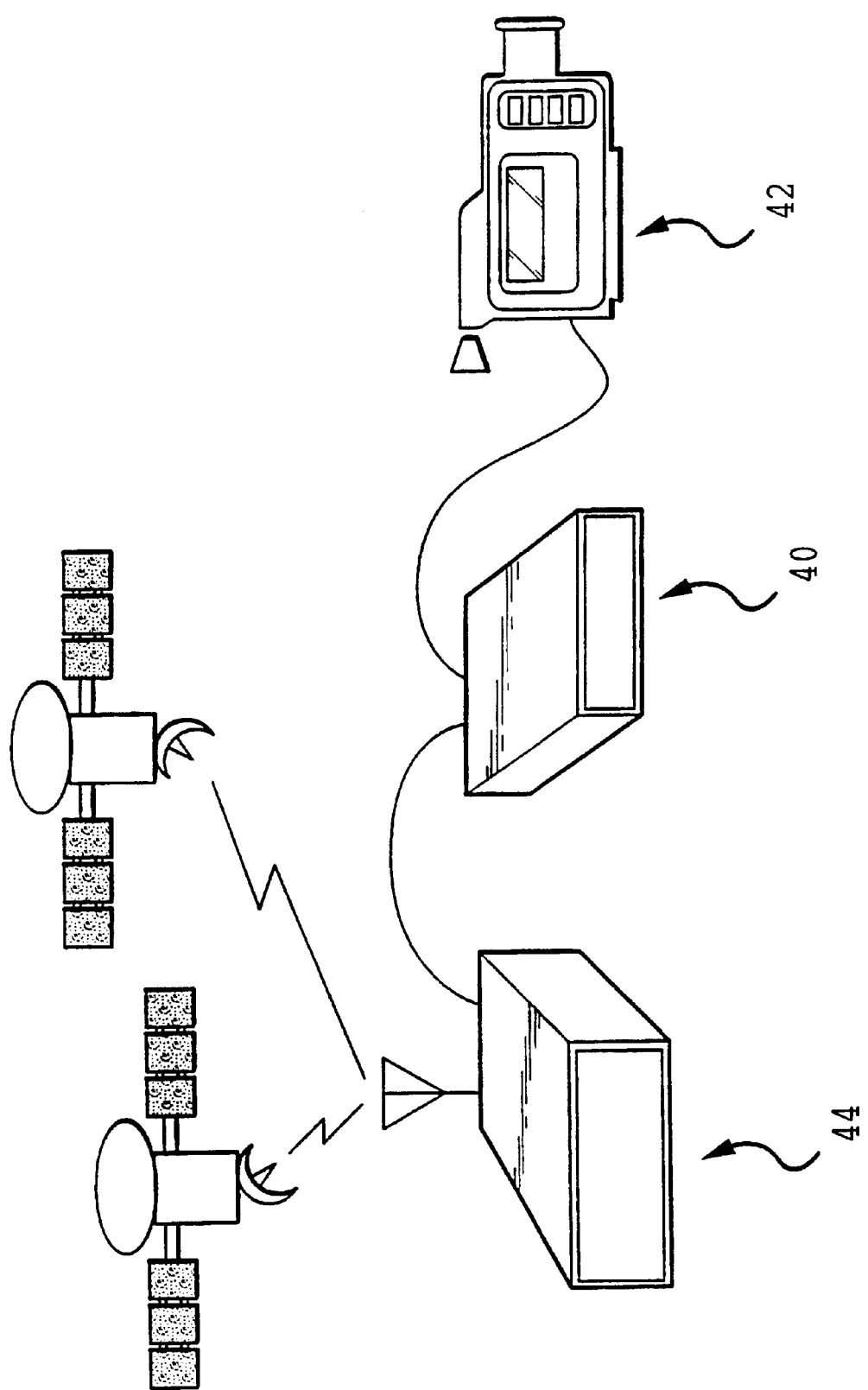
FIG. 3 shows the hardware device as configured in the recording mode, connected to the video recording device and GPS input device.

The recording mode involves recording video images and associated GPS data, and/or other data, including for example, directional and distance data, onto a single recording medium, such as for example, a tape or disk. In the recording mode, as shown in FIG. 3, the hardware device 40 is connected a video recording device 42, such as for example a camcorder, and a GPS input device 44, such as for example, a GPS receiver which is capable of delivering geographic data to a RS-232 compatible output port using the NEMA 183 protocol (National Maritime Electronics Association). Alternatively, a GPS antenna (not shown) can be connected to the hardware device 40 having a GPS chip, such as the Motorola Encore GPS chip, internal to the hardware device 40. The GPS antenna connector is disabled when the hardware device 40 does not containing an internal GPS chip. It is important to note that the setup of the system of the present invention in the recording mode does not require the hardware device 40 to be connected to a computer. This provides an advantage to a user of the system of the present invention because the use of the system in the recording mode will often occur in remote locations where it is a disadvantage to carry a portable computer.

In the recording mode, the hardware device 40 converts geographic information received from the GPS input device 44 into audible information which can be recorded as an audible sound on a recording medium (not shown) by the video recording device 42. As a consequence, when the video recording device 42 records images on a recording medium, geographic information relevant to the recorded video images is audible recorded on the audio channel of the recording medium. The recording mode is capable of operating continuously and intermittently. In this regard, a camcorder can be used as the video recording device 42 to continuously record images, such as for example a coast line from a helicopter, and associated GPS data. Alternatively, a digital still camera can be used as the video recording device 42 to capture a still image of an object, such as for example a house, and associated GPS data. If the video recording device is capable of recording audio stereophonically, only one of the audio channels is used to record geographic information, and the other audio channel is available for voice recording. In this regard, the other audio channel can be used to record other information, such as for example, attribute information relevant to the image recorded, which is verbally spoken by the person recording the images.

As configured in FIG. 3, the recording device 40 automatically enters the recording mode when the hardware device 40 attains a navigational fix from the GPS input device 44. When the hardware device 40 is configured in the recording mode, a GPS antenna is connected to the GPS antenna connector 23 if the hardware device 40 contains an internal GPS chip. If a GPS chip is used, a differential receiver can be connected to the GPS differential input connector 22 to provide more accurate GPS data. If the GPS chip is not present, or disabled, an external GPS receiver is connected to the GPS differential input connector 22. The microphone in/out connector 26 is connected to the video recording device's microphone connector using a dual stereo mini jack cable. A suitable external power source is connected to the external power connector 27, or alternatively, a battery (not shown) can be used to supply power. For example, a battery receiver (not shown) can be integrated into the hardware device 40 and the battery, such as for example a camcorder battery, can be plugged into the battery receiver. Preferably, the battery is compatible with Sony and JVC/Panasonic type batteries. The power off/on switch 10 is turned to the "on" or "auto" position. If voice notations are desired while recording, a microphone is connected to the voice in/out connector 24. When all the connections are properly made, the hardware device 40 will cause GPS information to be recorded onto the recording medium when the video recording device is used to record images.

The hardware device controls the audio output of speaker 14 to indicate proper operation. In this regard, the speaker 14 omits three beeps when the power is on. The speaker 14 emits two beeps, high to low, when the GPS signal is lost. The speaker 14 emits two beeps, low to high, when the GPS signal is acquired. The speaker 14 emits one low beep when the differential signal is lost. The speaker 14 emits one high beep, when the differential signal is acquired. Additionally, the hardware device 40 also causes the speaker 14 to emit clicks when GPS data is being transferred to the video recording device 42. In this regard, the speaker 14 clicks every two seconds when the hardware device 40 is not detecting a navigational lock from the GPS input device 44. The speaker 14 clicks when GPS data is being transferred to the video recording device 42.

Figure 4A:
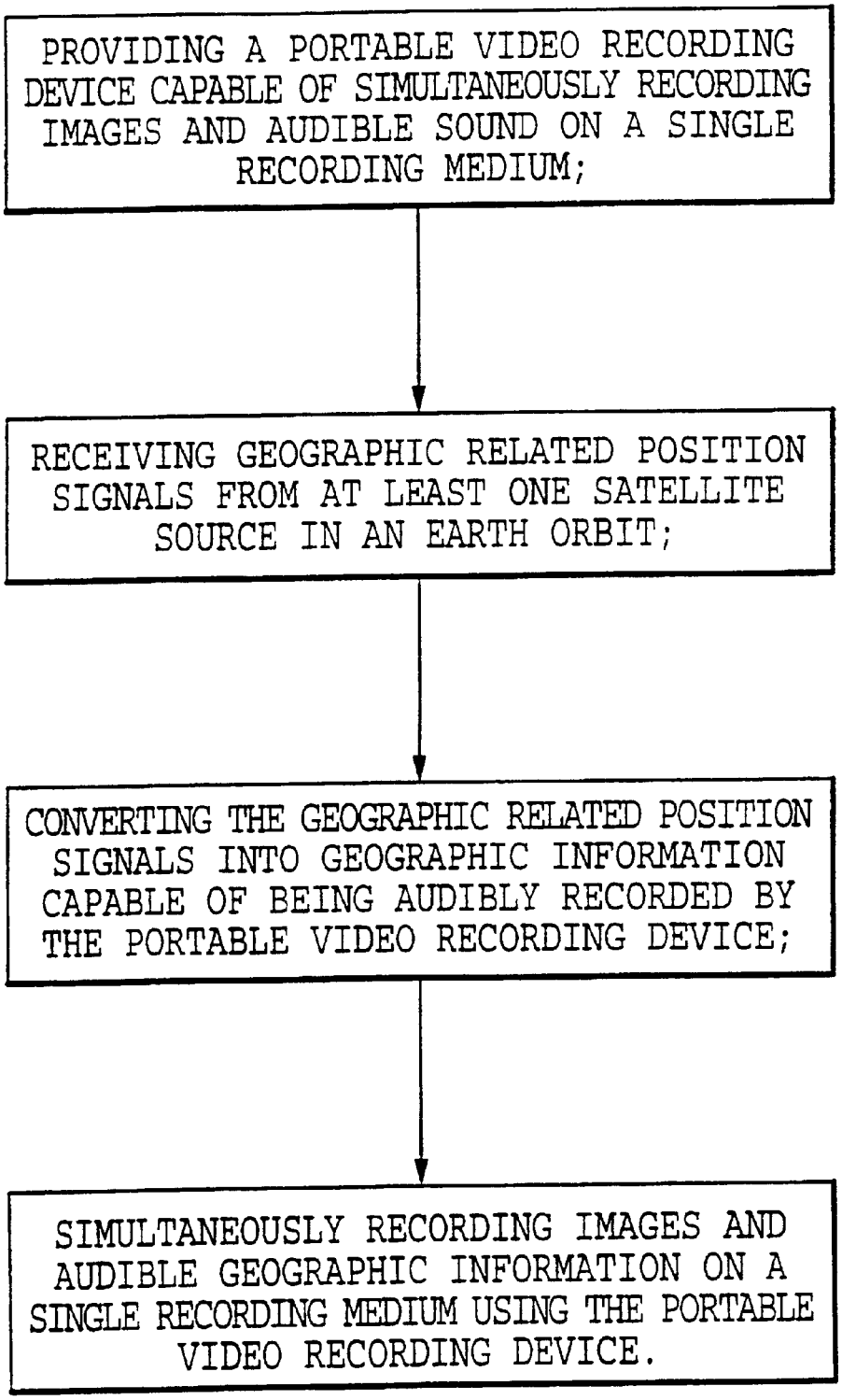
FIG. 4A is a flow chart of the operation of the recording mode.
Figure 4B:
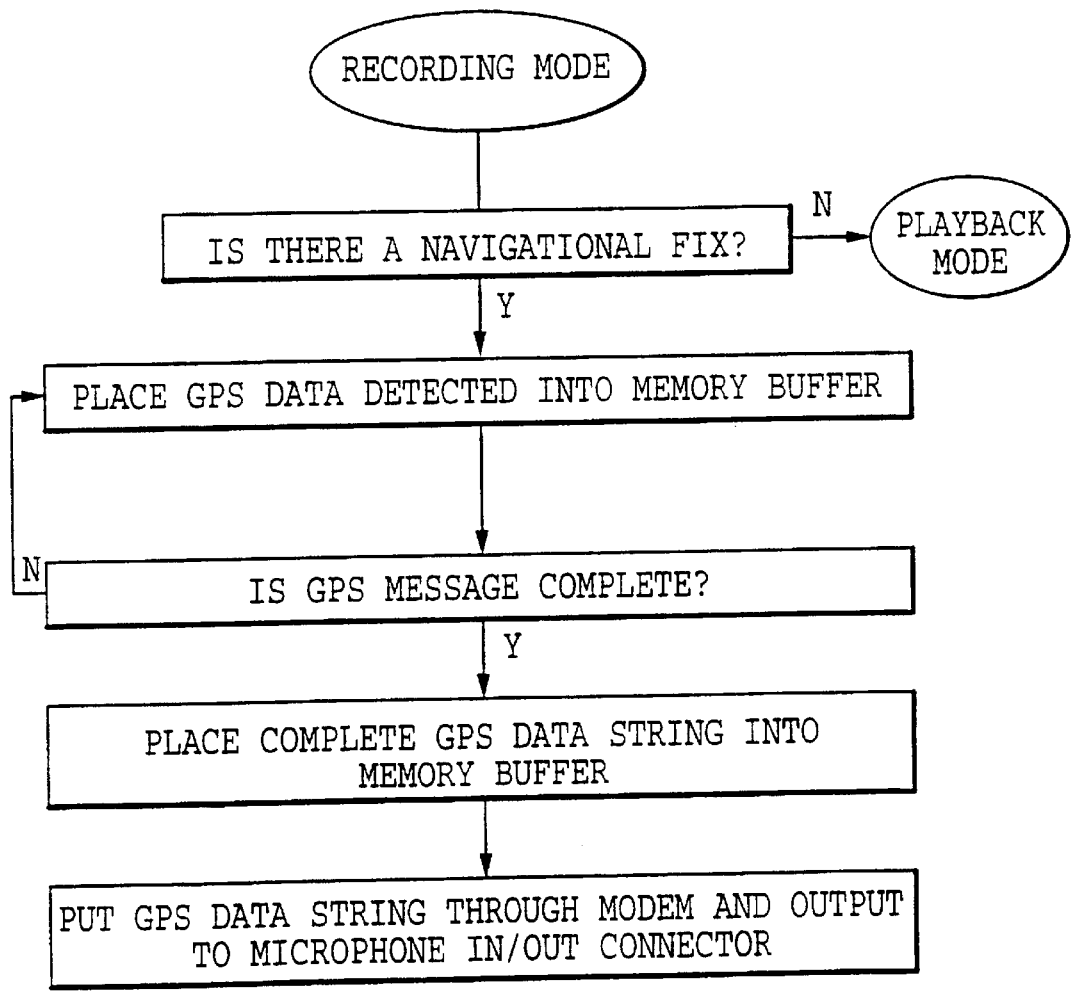
FIG. 4B is a flow chart of how the hardware device determines if the GPS data is detected by determining whether a navigational fix has been made.

The hardware device 40 includes a microprocessor (not shown), firmware (not shown), and other electronic circuitry (not shown) to convert the GPS data into audible information recordable by the video recording device. Referencing FIGS. 4A and 4B, the hardware device 40 determines if the GPS data is detected, by determining whether a navigational fix has been made. If no fix has been made, the hardware device 40 assumes that the playback mode is operational. If there is a fix, the hardware device assumes that the recording mode is operational. In the record mode, the hardware device 40 buffers the GPS data, and determines when a complete GPS data string has been received. When complete, the GPS data string is put into a second buffer (not shown), through a modem (not shown) and outputted on the microphone in/out connector 26. The modem is for example a standard modem using minimum shift key or frequency shift key protocols. Alternatively, the modem's output can be outputted to the speaker 14, and the GPS data recorded using the video recording device's external microphone. It should be noted that output on the speaker 14 can be transmitted to other locations, via wireless transmission, and processed at a remote location to determine the geographic location of the sender.

Figure 5:
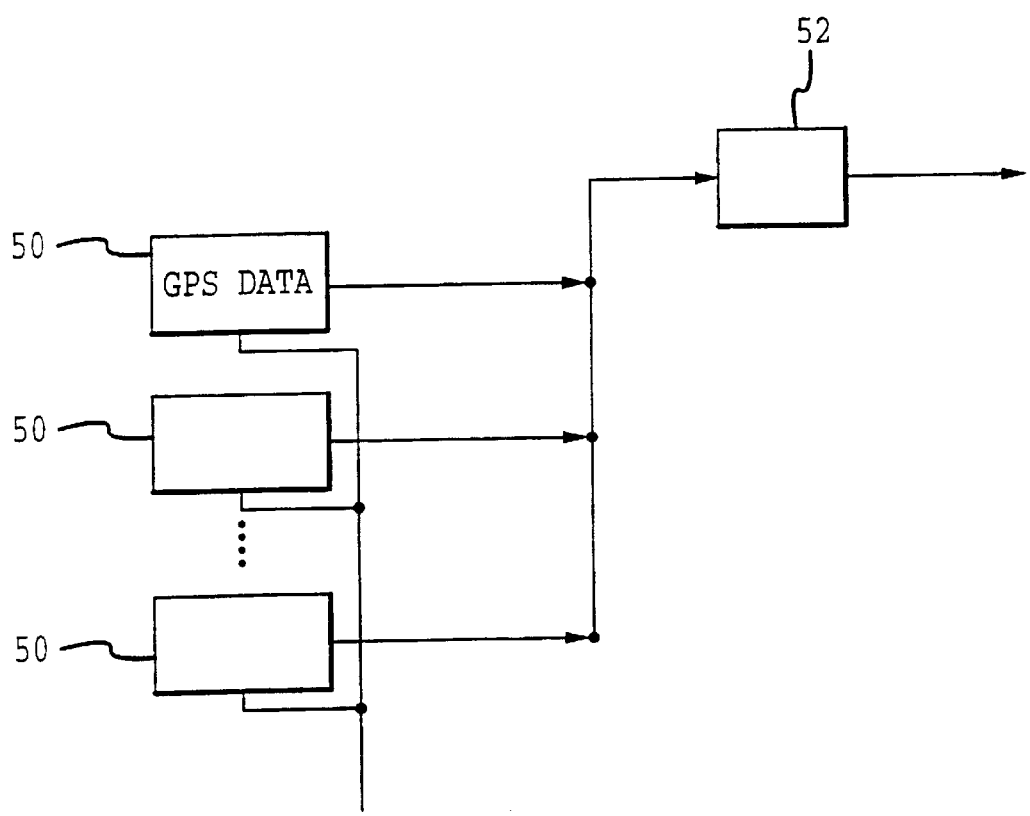
FIG. 5 shows the hardware device having multiple RS-232 input ports.

Additionally, as shown in FIG. 5, multiple RS-232 input ports can be used. Devices such as a digital compass or digital range finder, can be used to provide, along with the GPS data, relevant information regarding the images being recorded. In this regard, each RS-232 input has its own buffer 50 to determine when the message is complete. When the message is complete, the message is sent automatically to the modem 52 and outputted to the microphone in/out connector 26. In this regard, the data from the various sources are not synchronized before recording. The data is sent when a complete message has been detected. This process is known as packetising data. In this regard, the microprocessor (not shown) polls the various devices 50 to determine when the message is complete. When complete, the message is transferred to the modem 52 and then to the microphone in/out connector 26. It should be noted that the RS-232inputs are used to receive messages in the NEMA 183 protocol. However, if a different protocol is used, the hardware device 40 is capable of flash programming, that is downloading appropriate software, to convert the message protocol to a NEMA 183 protocol. Alternatively, the microprocessor could be used to synchronize all the buffers 50 before sending data to the modem 52 and outputting such data to the microphone in/out connector 26.

The navigational light 28 is used to indicate correct connection and successful transfer of GPS data. In this regard, the connection with the video recording device 42 is monitored to determined if the video recording device 42 is on. When proper connection to the microphone in/out connector 26 and video recording device 42 camcorder is on, voltage will be provided on the connection between the video recording device 42 and the hardware device 40. This connection is used to turn the hardware device 40 on during the recording mode when the power off/on switch 10 is in the "auto" position. Next, the microprocessor determines if GPS data is being received, and if GPS data is being received, the navigational light 28 is activated. When GPS data is being recorded, the navigational light 28 blinks.

Figure 6:
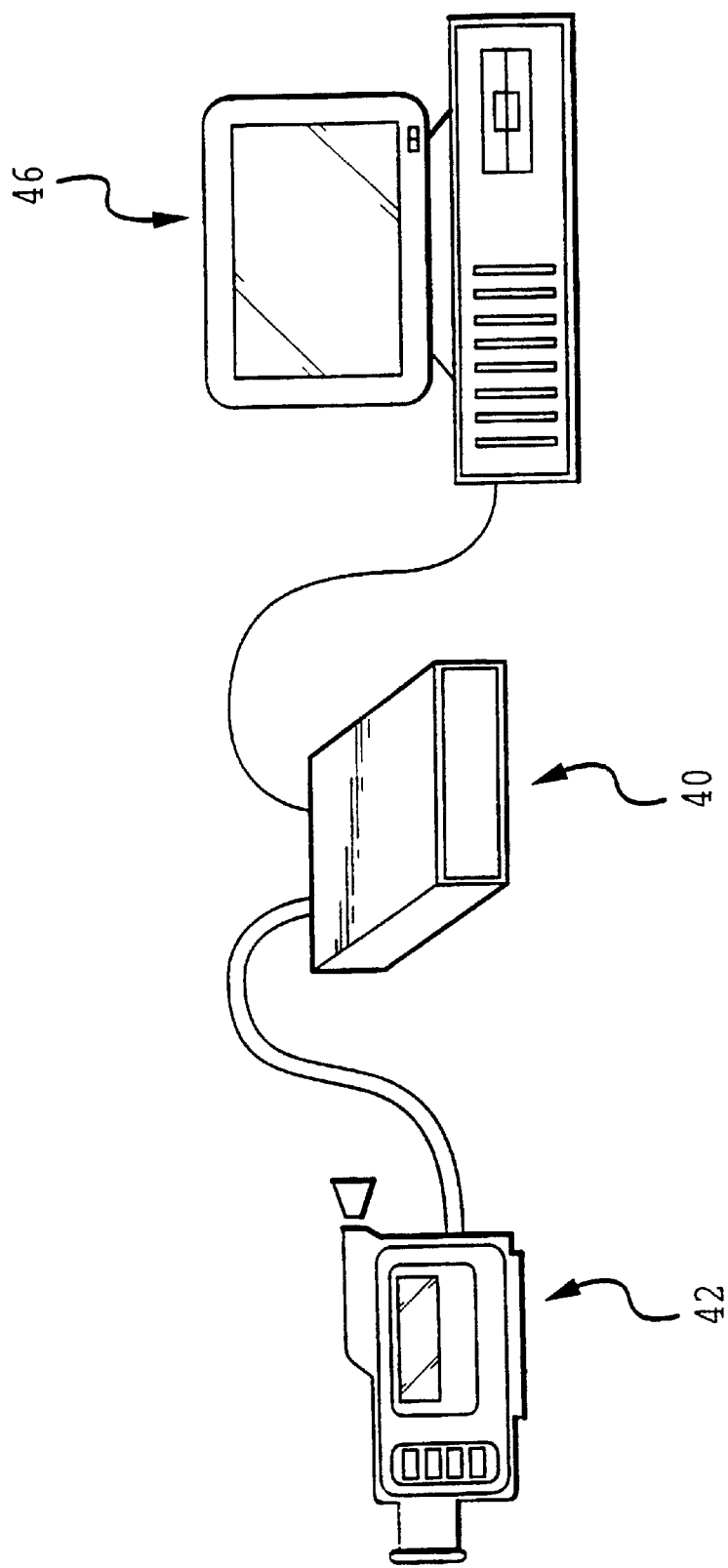
FIG. 6 shows the hardware device, as configured in the index mode, connected to a computer and a video recording device.

The indexing mode involves transferring GPS data from the recording medium and associating each GPS data point with the part of the recording medium containing the recorded images corresponding to the GPS data. As a result of transferring and processing the GPS data, a map is created which displays icons for each GPS referenced location where at images were recorded. In the indexing mode, as shown in FIG. 6, the hardware device 40 is connected to a computer 46 and a video recording device 42, and converts audible sound corresponding to the geographic information from the video recording device 42 into geographic information which can be transferred to the computer 46. In this regard, the microphone in/out connector 26 is connected to the headphone/audio output connector on the video recording device, the LanC connector 25 is connected to the video recording device's 42 LanC connector; and the computer compatible-serial port 18 is connected to the computer 46, using for example a 9-nine pin RS-232 cable. In this configuration, the system of the present invention is capable of transferring GPS data from the recording medium to the computer 46, and associating each GPS data point with the part of the recording medium containing the recorded images corresponding to the GPS data point.

The hardware device 40 includes a microprocessor, firmware, and other electronic circuitry to convert the audible GPS data, recorded by the video recording device 42 in the recording mode, into GPS data which is communicable to the computer 46. In this regard, the microprocessor determines if audible GPS data is being received from the video recording device 42. If audible GPS data is being received, the hardware device 40 converts the audible GPS data into data communicable to the computer 46 by transferring the audible GPS data through a modem, and buffering the modem's output until a complete message has been received. The modem is for example a standard modem using minimum shift key or frequency shift key protocols. When a complete GPS data string has been received, the GPS data string is outputted to the computer compatible-serial port 18 and to the computer 46. Once received by the computer 46, the system of the present invention causes the GPS data to be associated with a location on the recording medium which corresponds to the recorded images. The GPS data is stored as an index layer to a map, so that the GPS data can be overlaid on a displayed map. As a result, the system of the present invention displays over a map icons or markers for each GPS referenced location where at images were recorded.

Figure 7:
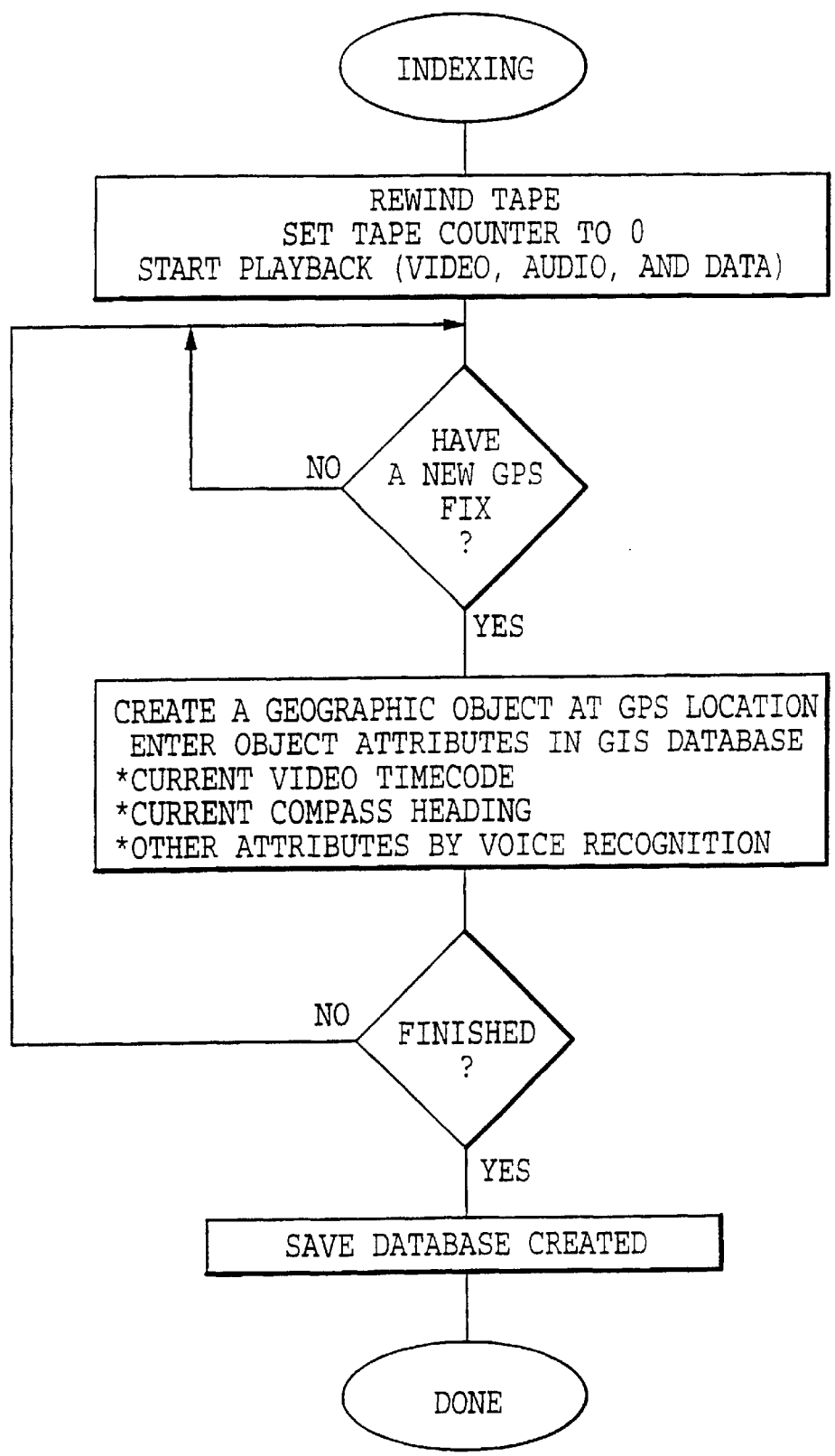
FIG. 7 is a flow chart of operation of the system of the present invention in the indexing mode.
Figure 8:
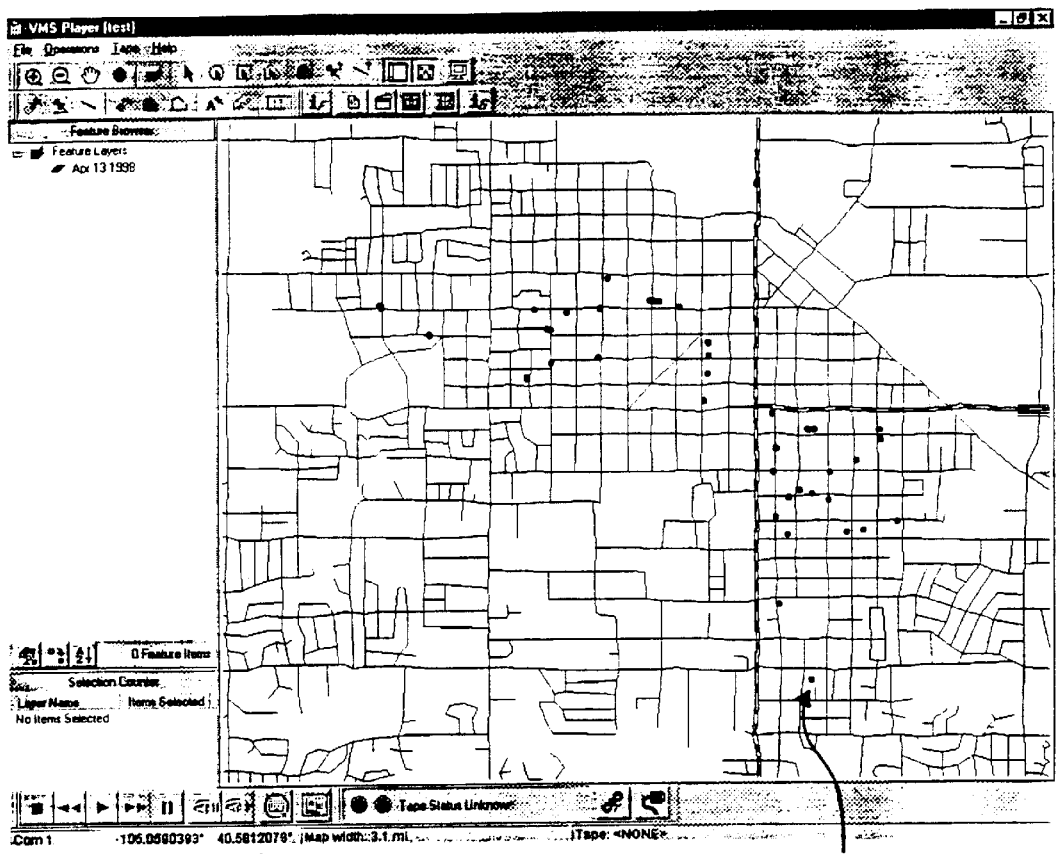
FIG. 8 is a graphical display produced in accordance with the present invention showing index points.

Referencing FIG. 7, the indexing mode first involves placing the recording medium desired to be indexed in a video recording device 42 capable of play back. The video recording device 42 is set for the type of time coding the recording medium was recorded with (e.g., normal or RC time code) during the recording mode. The software of the present invention next searches for connection to the hardware device 40, confirms correct connection of the hardware device 40, and that GPS data is being received (i.e., a GPS fix). The indexing starts from the beginning of the recording medium, or from any position of the recording medium having a corresponding time code. The indexing operation involves causing the video recording device 42 to properly position the recording medium, and to play the recording medium. As shown in FIG. 8, as the recording medium plays, GPS data begins to appear on the computer's 46 screen. The GPS points are placed on an index layer and associated with a location of the images recorded on the recording medium in a data base. When the recording medium is done playing back, the indexing process is completed, and the recorded images data associated with the GPS data can be reviewed in the playback mode. Additionally, the indexing mode can involve transferring the recorded images from the recording medium to some other media, for example CD ROM or hard disk.

Figure 9:
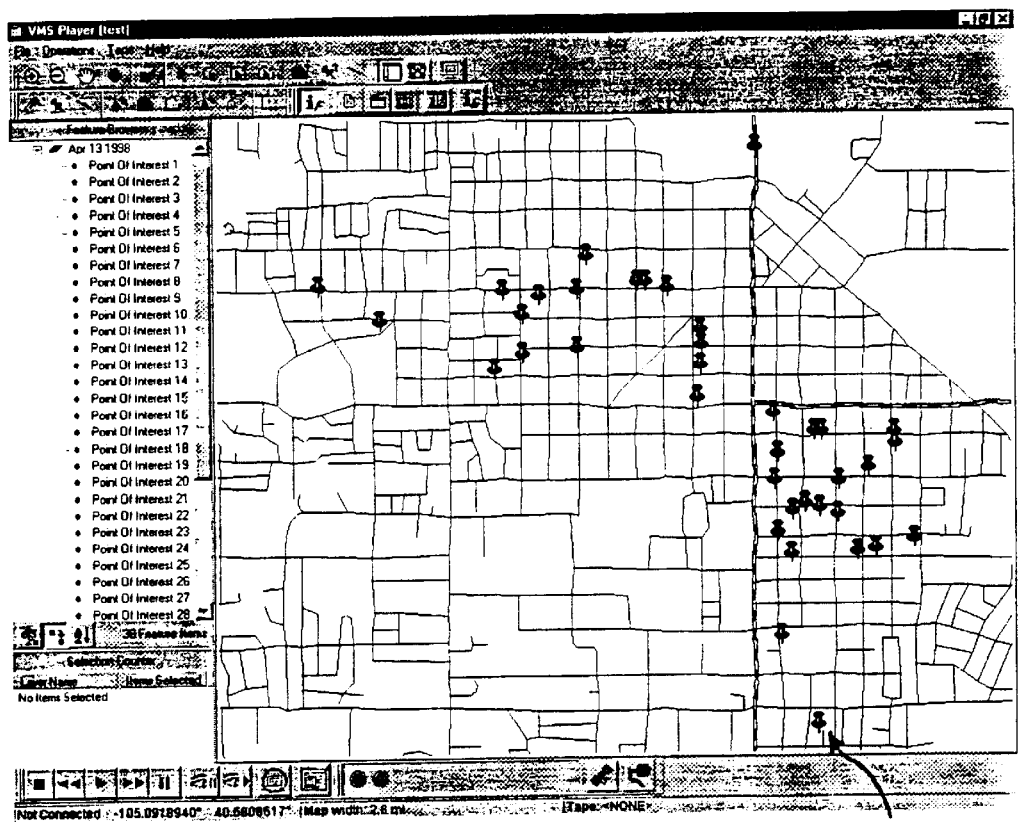
FIG. 9 is a graphical display produced in accordance with the present invention showing feature points.
Figure 10:
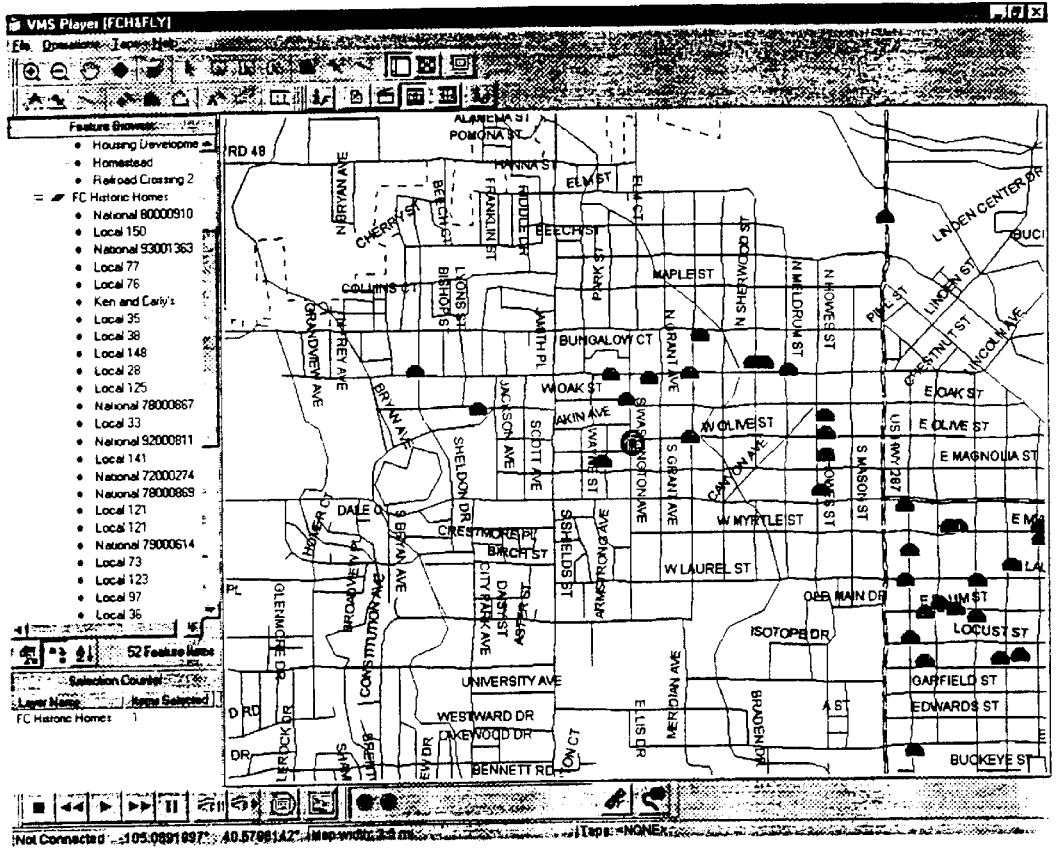
FIG. 10 is a graphical display produced in accordance with the present invention showing feature points.

One or more different layers can be displayed during the indexing operation. For example, as shown in FIGS. 8, the index layer can be displayed superimposed on a background layer containing a map of roads, counties or geo-referenced area photo, or any other available map. In addition, as shown in FIGS. 9 and 10, feature layers containing feature markers can be placed on the map to highlight certain locations. Feature markers can be placed on the map during the indexing operation. For example, if the recording medium was specifically made to record information about certain locations, feature markers can be added during the indexing operation by interrupting the indexing operation, and adding a feature marker. Additionally, as shown in FIG. 8, GPS data 80 can be monitored on the screen during the indexing operation.

The index layer and all other layers created during the indexing operation can be sorted in the filing system called a tape library. A tape library can contain indexed information from several different recording mediums on its index layer, and also contains any background layers and feature layers which have been added. The tape library is a central filing system that organizes information about a particular area or subject. For example, a tape library called "Weeds 1998" in which recorded images of fields before and after herbicide applications are available, which allows for the easy documentation of needs and results over time. In this regard, the contents of this tape library can be compared with libraries that were created at other times. The layers in this type library would represent different kinds of weeds and/or the state of infestation on different dates, and boundaries of treatment applications.

In the playback mode, the system of the present invention causes recorded images to be played back based on the selection of a icon or marker on a computer generated indexed map. In the playback mode, as is similarly shown in FIG. 6 for the indexing mode, the hardware device 40 is connected to a computer 46 and a video recording device 42. In this regard, the microphone in/out connector 26 is connected to the headphone/audio output connector on the video recording device; the LanC connector 25 is connected to the video recording device's 42 LanC connector; and the computer compatible-serial port 18 is connected to the computer 46, using for example a 9-nine pin RS-232 cable. In this configuration, the video recording device's 42 playback functions are controlled by the software of the present invention vis-a-via the computer 46.

Figure 11:
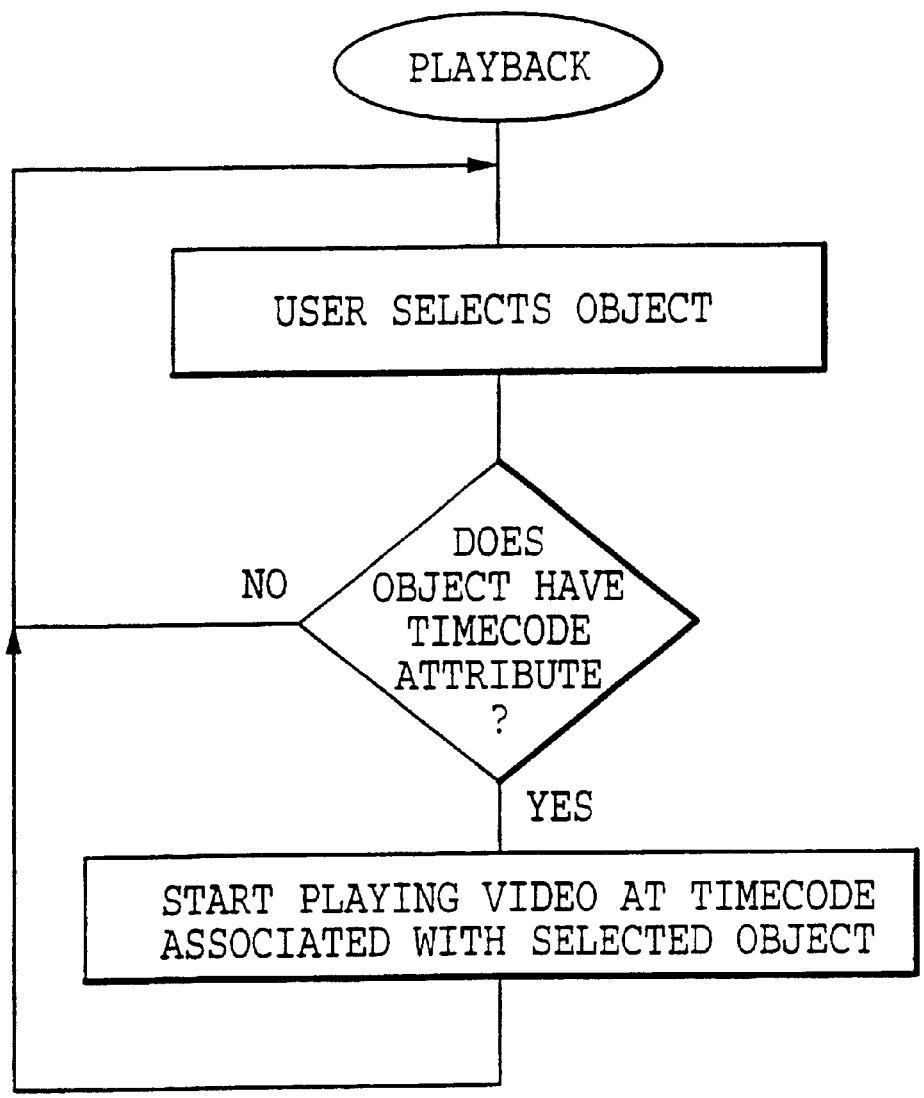
FIG. 11 is a flow chart of operation of the system of the present invention in the playback mode.
Figure 12:
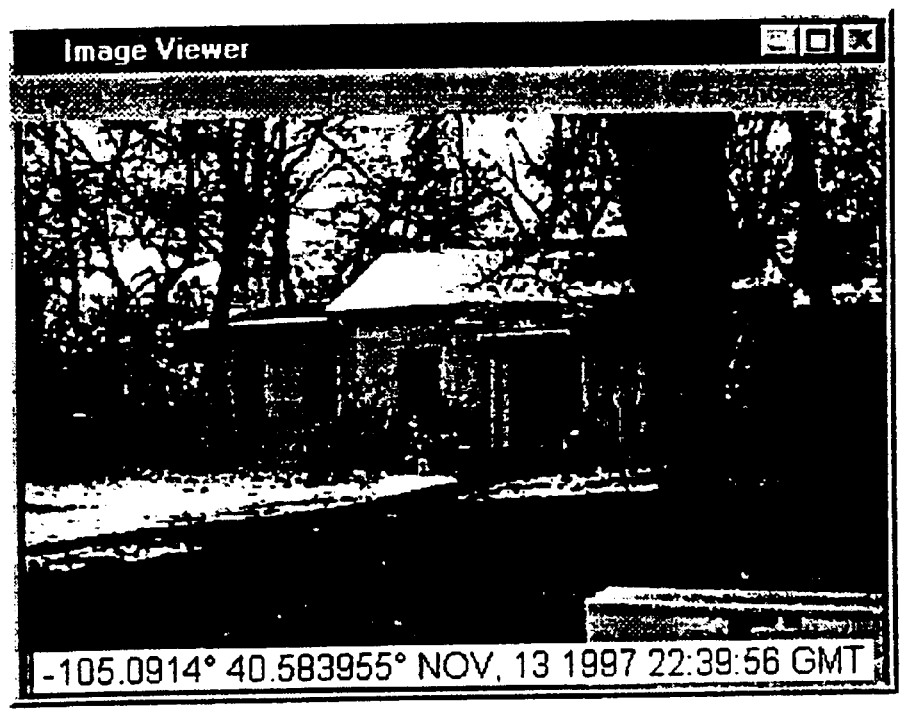
FIG. 12 is the display of an image corresponding to geographic information displayed on graphical display, which was recorded using the method and apparatus of the present invention.

Referencing FIG. 11, the playback mode allows for the display of a map and control of the video recording device 42. As shown in FIGS. 8–10, the displayed map shows an indexed point 82 and featured point 84 which were created during the indexing mode. The index point 82 indicates that recorded images at that GPS referenced location are available for viewing, for example a house that is for sale. The feature point 84 indicates special information regarding the GPS referenced location, for example that the house for sale is ranch styled house. If the indexed point 82 is selected, the images recorded at that location are displayed by the video recording device 42, as shown in FIG. 11. In this regard, the index point is correlated with the location of the recorded images on the recording medium. As a result, the video recording device is caused to position the recording medium at the location corresponding to the recorded images and play back the recorded images. In the playback mode, the speaker 14 outputs any non-GPS audio information, such as verbal attribute information, which has been recorded. It should be noted that the software of the present invention calibrates the winding bias of the video recording device 42. In this regard, the first time the video recording device 42 is used in the playback mode, the system of the present invention performs a calibration associated with, for example, the tape winding speed of the camcorder. A fully rewound tape is loaded in to the camcorder, and the system cycles through a series of fast forwards and rewinds. In this regard, when segments of a video tape are played, the tape will start and stop at the correct location and/or time codes.

Alternatively, if the recorded images have been transferred to some other media, for example CD ROM or hard disk, the system will cause the computer to play back the images that were recorded at that selected location.

The foregoing description of the present invention has been presented for purposes of illustration and description. The description is not intended to limit the invention to the form disclosed herein. Consequently, the invention and modifications commensurate with the above teachings and skill and knowledge of the relevant art are within the scope of the present invention. It is intended that the appended claims be construed to include all alternative embodiments as permitted by the prior art.

What is claimed is:

1. A method for correlating geographic information with images that are recorded with a portable video recording device, the method comprising the steps of:
   (a) providing a portable video recording device capable of simultaneously recording images and audible sound on a single recording medium, wherein the portable video recording device is capable of recording images in a first direction;
   (b) receiving geographic related position signals from at least one satellite source in an earth orbit;
   (c) converting the geographic related position signals into geographic information capable of being audibly recorded by the portable video recording device; and
   (d) receiving directional related data from at least one magnetic-based compass regarding the first direction;
   (e) converting the directional related data into directional information capable of being audibly recorded by the portable video recording device; and
   (f) simultaneously recording images and audible geographic information on a single recording medium using the portable video recording device, wherein said step of simultaneously recording images and audible geographic information includes simultaneously recording images, audible geographic information and audible directional information on a single recording medium using the portable video recording device.

2. The method of claim 1, wherein said step of simultaneously recording images, audible geographic information and audible directional information includes recording audible directional information for only a portion of the time during which images are recorded.

3. A method for reproducing images in accordance with the geographic location at which the images were recorded, the method comprising the steps of:
   (a) providing a portable video recording device capable of simultaneously recording images and audible sound on a single recording medium, wherein said video recording device includes a counter capable of tracking the relative position of the recording medium;
   (b) receiving geographic related position signals from at least one satellite source in an earth orbit;
   (c) converting the geographic related position signals into geographic information capable of being audibly recorded by the portable video recording device;
   (d) simultaneously recording images and audible geographic information on a single recording medium using the portable video recording device;
   (e) providing a video playback device that is capable of simultaneously reproducing images and audible sound recorded on a recording medium;
   (f) reproducing the audible sound on at least a portion of the recording medium containing recorded images and audible geographic information;
   (g) converting at least a portion of the audible sound relating to the geographic information into at least one set of longitudinal and latitudinal coordinates;
   (h) relating at least one set of longitudinal and latitudinal coordinates to the numerical value of the counter relating to the position of the recording medium containing the audible sound relating to the geographic information;
   (i) displaying a geographic map;
   (j) displaying on the geographic map at least one icon relating to at least one set of longitudinal and latitudinal coordinates;
   (k) selecting one of the icons displayed on the geographic map; and
   (l) reproducing the images recorded on the recording medium at the position indicated by the numerical value of the counter corresponding to a set of longitudinal and latitudinal coordinates related to the icon selected.

4. The method of claim 1, further comprising the step of displaying a geographic map.

5. The method of claim 4, wherein displaying a geographic map includes displaying at least one icon relating to at least one set of longitudinal and latitudinal coordinates.

6. The method of claim 5, further comprising the step of selecting one of the at least one icons displayed on the geographic map.

7. The method of claim 6, further comprising the step of reproducing the images recorded on the recording medium at the position indicated by the numerical value of the counter corresponding to the set of longitudinal and latitudinal coordinates relating to the icon selected when the at least one icon is selected by the user of the system.

8. A system for correlating geographic information with images that are recorded with a portable video recording device, the system comprising:
   a portable video recording device capable of simultaneously recording images and audible sound on a single recording medium, wherein the portable video recording device is capable of simultaneously recording images, audible geographic information and audible directional information on a single recording medium,
   at least one satellite source in an earth orbit, wherein the at least one satellite source transmits geographic related position signals to the portable video recording device;
   a converter within the portable video recording device for converting the geographic related position signals into geographic information capable of being audibly recorded by the portable video recording device;
   at least one magnetic-based compass capable of communicating directional related data regarding the first direction to the portable video recording device; and
   a converter within the portable video recording device for converting the directional related data into directional information capable of being audibly recorded by the portable video recording device.

9. The system of claim 8, the system further comprising a display of a geographic map.

10. The system of claim 9, the display of a geographic map including at least one icon relating to at least one set of longitudinal and latitudinal coordinates.

11. The system of claim 10, wherein the at least one icon can be selected by the user of the system.

12. The system of claim 11, wherein the images recorded by the portable video recording device are capable of being reproduced at the position indicated by the numerical value of the counter corresponding to the set of longitudinal and latitudinal coordinates relating to the icon selected when the at least one icon is selected by the user of the system.

13. A system for reproducing images in accordance with the geographic location at which the images were recorded, the system comprising:
   a portable video recording device capable of simultaneously recording images and audible sound on a single recording medium, wherein said video recording device includes a counter capable of tracking the relative position of the recording medium;
   at least one satellite source in an earth orbit for transmitting geographic related position signals to the portable video recording device;
   a converter for converting the geographic related position signals into geographic information capable of being audibly recorded by the portable video recording device;
   a video playback device that is capable of simultaneously reproducing images and audible sound recorded on a recording medium, wherein the video playback device is also capable of displaying a geographic map;
   a converter for converting at least a portion of the audible sound reproduced by the video playback device relating to the geographic information into at least one set of longitudinal and latitudinal coordinates, wherein the at least one set of longitudinal and latitudinal coordinates relate to the numerical value of the counter relating to the position of the recording medium containing the audible sound relating to the geographic information;
   at least one icon, displayed on the geographic map, relating to at least one set of longitudinal and latitudinal coordinates, the at least one icon being able to be selected by a user of the system such that when the at least one icon is selected by the user, the images recorded on the recording medium are reproduced at the position indicated by the numerical value of the counter corresponding to a set of longitudinal and latitudinal coordinates related to the at least one icon selected.

14. A system for correlating geographic information with images that are recorded with a portable video recording device, the system comprising:
   means for simultaneously recording images, audible geographic information and audible directional information on a single recording medium,
   at least one satellite source in an earth orbit, wherein the at least one satellite source transmits geographic related position signals to the means for simultaneously recording;
   a first means for converting the geographic related position signals into geographic information capable of being audibly recorded by the means for simultaneously recording;
   at least one magnetic-based compass capable of communicating directional related data regarding the first direction to the portable video recording device; and
   a second means for converting the directional related data into directional information capable of being audibly recorded by the means for simultaneously recording.

15. The system of claim 14, the system further comprising a display means for displaying a geographic map.

16. The system of claim 15, the display means displaying at least one icon relating to at least one set of longitudinal and latitudinal coordinates.

17. The system of claim 16, wherein the at least one icon can be selected by the user of the system.

18. The system of claim 17, wherein the images recorded by the means for simultaneously recording are capable of being reproduced at the position indicated by the numerical value of the counter corresponding to the set of longitudinal and latitudinal coordinates relating to the icon selected when the at least one icon is selected by the user of the system.

19. A system for reproducing images in accordance with the geographic location at which the images were recorded, the system comprising:
   means for simultaneously recording images and audible sound on a single recording medium, wherein said means for simultaneously recording includes a counter capable of tracking the relative position of the recording medium;
   at least one satellite source in an earth orbit for transmitting geographic related position signals to the means for simultaneously recording;
   a first means for converting the geographic related position signals into geographic information capable of being audibly recorded by the means for simultaneously recording;
   a video playback means for simultaneously reproducing images and audible sound recorded on a recording medium, wherein the video playback means is also capable of displaying a geographic map;

a second means for converting at least a portion of the audible sound reproduced by the video playback means relating to the geographic information into at least one set of longitudinal and latitudinal coordinates, wherein the at least one set of longitudinal and latitudinal coordinates relate to the numerical value of the counter relating to the position of the recording medium containing the audible sound relating to the geographic information;

at least one icon, displayed on the geographic map, relating to at least one set of longitudinal and latitudinal coordinates, the at least one icon being able to be selected by a user of the system such that when the at least one icon is selected by the user, the images recorded on the recording medium are reproduced at the position indicated by the numerical value of the counter corresponding to a set of longitudinal and latitudinal coordinates related to the at least one icon selected.

* * * * *